US010569425B2

(12) United States Patent
Fukurotani et al.

(10) Patent No.: US 10,569,425 B2
(45) Date of Patent: Feb. 25, 2020

(54) HAND STOCKER AND HAND

(71) Applicant: SUGINO MACHINE LIMITED, Toyama Prefecture (JP)

(72) Inventors: Takuji Fukurotani, Toyama (JP); Toyoaki Mitsue, Toyama (JP)

(73) Assignee: SUGINO MACHINE LIMITED, Uozu (JP)

( * ) Notice: Subject to any disclaimer, the term of this patent is extended or adjusted under 35 U.S.C. 154(b) by 311 days.

(21) Appl. No.: 15/419,301

(22) Filed: Jan. 30, 2017

(65) Prior Publication Data
US 2017/0252928 A1   Sep. 7, 2017

(30) Foreign Application Priority Data

Mar. 1, 2016 (JP) .................................. 2016-039430

(51) Int. Cl.
    *B25J 15/04*    (2006.01)
    *B23Q 3/155*    (2006.01)
    *B25J 19/00*    (2006.01)

(52) U.S. Cl.
    CPC ...... *B25J 15/0491* (2013.01); *B23Q 3/15536* (2016.11); *B25J 19/0075* (2013.01); *B23Q 2003/15527* (2016.11); *Y10T 483/1809* (2015.01)

(58) Field of Classification Search
CPC ............ B23Q 3/15526; B23Q 3/15536; B23Q 2003/15527; B25J 15/0491; B25J 19/0075; Y10T 483/18; Y10T 483/1809
USPC .......................................... 70/61, 62; 211/4
See application file for complete search history.

(56) References Cited

U.S. PATENT DOCUMENTS

| | | | | |
|---|---|---|---|---|
| 3,185,494 A | * | 5/1965 | Dziedzic | ............ B23Q 3/15526 279/89 |
| 3,473,773 A | * | 10/1969 | Meyer | ..................... B60R 9/058 224/309 |
| 3,930,302 A | * | 1/1976 | Ochiai | ............... B23Q 3/15526 483/3 |

(Continued)

FOREIGN PATENT DOCUMENTS

CN    204748149 U  * 11/2015
CN    105234817 A    1/2016

(Continued)

OTHER PUBLICATIONS

Jul. 24, 2017 Extended Search Report issued in European Patent Application No. 17156413.1.

*Primary Examiner* — Eric A. Gates
(74) *Attorney, Agent, or Firm* — Oliff PLC

(57) ABSTRACT

To provide a hand stocker with a simple structure. A hand stocker housing a hand for attaching on an actuator includes a housing board that houses the hand in a hung state and includes a hanging mechanism hanging the hand on a board surface facing the hand. The hanging mechanism includes: a hooking member that extends in a horizontal direction from the board surface to engage with a hanging portion disposed in the hand; a pressing member that prevents the hand hung on the hooking member from moving to a direction separating from the board surface; and a supporting member that restricts the hand hung on the hooking member from moving to a direction approaching the board surface. The hand is sandwiched between the pressing member and the supporting member and housed.

9 Claims, 9 Drawing Sheets

(56) References Cited

U.S. PATENT DOCUMENTS

| | | | | |
|---|---|---|---|---|
| 4,026,415 | A * | 5/1977 | Sarley | A47F 3/002 211/4 |
| 4,660,274 | A * | 4/1987 | Goumas | B23Q 3/15506 294/119.1 |
| 5,256,128 | A * | 10/1993 | Neumann | B23Q 1/0063 294/86.4 |
| 5,372,567 | A * | 12/1994 | Whittington | B23Q 1/0009 219/86.8 |
| 5,420,762 | A * | 5/1995 | Lewis | B60Q 1/0441 24/701 |
| 5,669,751 | A * | 9/1997 | Hoffman | B23Q 7/04 198/950 |
| 6,330,815 | B1 * | 12/2001 | Duncan | B60R 7/14 211/4 |
| 6,393,877 | B1 * | 5/2002 | Church | A47F 5/0846 211/59.1 |
| 6,589,144 | B1 * | 7/2003 | Ebihara | A61C 13/0004 483/55 |
| 6,685,608 | B2 * | 2/2004 | Menzio | B23Q 3/15533 483/3 |
| 7,669,443 | B2 * | 3/2010 | Varner | E05B 73/00 109/51 |
| 8,267,363 | B2 * | 9/2012 | Begic | A47B 96/067 211/4 |
| 8,297,088 | B1 * | 10/2012 | Zhang | G06F 1/182 292/150 |
| 8,591,389 | B2 * | 11/2013 | Tomioka | B23B 31/06 483/55 |
| 8,602,954 | B2 * | 12/2013 | Ogasawara | B23Q 3/15526 211/70.6 |
| 2010/0127136 | A1 | 5/2010 | Markoff | |
| 2011/0017007 | A1 | 1/2011 | Lin et al. | |
| 2016/0235220 | A1 * | 8/2016 | Abebe | A47G 29/08 |

FOREIGN PATENT DOCUMENTS

| | | | | |
|---|---|---|---|---|
| DE | 3532667 A1 * | 3/1987 | | B23Q 3/15553 |
| JP | H01-234188 A | 9/1989 | | |
| JP | 2014-151041 A | 8/2014 | | |
| JP | 2015-27715 A | 2/2015 | | |
| KR | 20-1998-0053930 U | 10/1998 | | |

\* cited by examiner

HAND STOCKER AND HAND

TECHNICAL FIELD

The present invention relates to a hand stocker for housing a hand that is replaceably mounted on an actuator or similar component and a hand that is housed by this hand stocker.

BACKGROUND ART

There is known an automatic hand changer for changing a hand of an industrial robot. For a place to put the hand (hand stocker) of the automatic hand changer, the following, for example, is proposed: a supporting plate that supports a connecting surface of the hand and a surface on the opposite side is supported in a standing portion of a placing table main body with a plurality of springs disposed at an equal distance from a connection center of the hand. Then, a placing plate that supports a placing surface of the hand is supported on a horizontal supporting surface of the placing table main body via a slide mechanism that horizontally moves in parallel with a moving direction of the automatic hand changer (Japanese Unexamined Patent Application Publication No. H1-234188).

Since a hand stocker according to Japanese Unexamined Patent Application Publication No. H1-234188 includes many movable parts, the structure is complicated. Accordingly, an object of the present invention is to provide a hand stocker with a simple structure. Another object of the present invention is to provide a hand appropriate for being housed in this hand stocker.

SUMMARY

To achieve the above-described objects, this representative invention is a hand stocker housing a hand for attaching on an actuator. The hand stocker includes a housing board that houses the hand in a hung state and includes a hanging mechanism hanging the hand on a board surface facing the hand. The hanging mechanism includes: a hooking member that extends in a horizontal direction from the board surface to engage with a hanging portion disposed in the hand; a pressing member that prevents the hand hung on the hooking member from moving to a direction separating from the board surface; and a supporting member that restricts the hand hung on the hooking member from moving to a direction approaching the board surface. The hand is sandwiched between the pressing member and the supporting member and housed.

According to the present invention, a hand stocker with a simple structure can be provided. Problems, configurations, and effects other than the matters described above will be made apparent by the following description of embodiments.

DESCRIPTION OF EMBODIMENTS

First Embodiment

Figure 1:
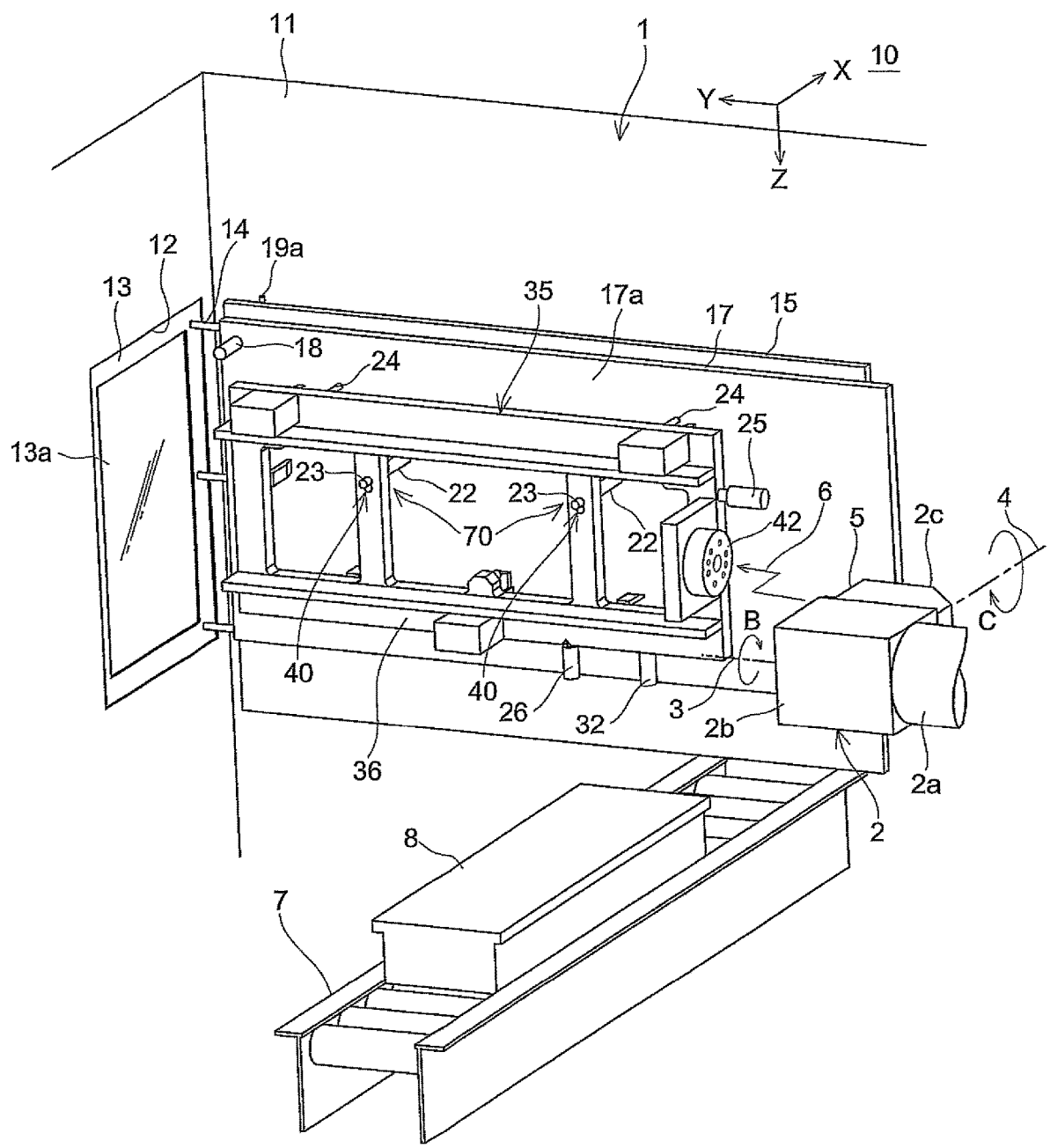
FIG. 1 is an external perspective view of a hand stocker according to a first embodiment of the present invention.

The following describes embodiments of the present invention in detail in accordance with the drawings. With reference to FIG. 1, a hand stocker 10 according to a first embodiment of the present invention is used, for example, as a device for housing a hand 35, which is replaceably mounted on an actuator 2. The actuator 2 functions as a device for conveying a working object component (hereinafter referred to as a "workpiece 8"). The hand stocker 10 is used in combination with a machine tool, a washing machine, or similar machine. In the case where the hand stocker 10 is combined with the washing machine, the hand 35 housed in the hand stocker 10 is attached on the actuator 2. The actuator 2 holds the workpiece 8 with the hand 35 and conveys to a washing area of the washing machine. Ejecting a cleaning fluid from a washing nozzle to the workpiece 8 in a state where the workpiece 8 is held by the actuator 2 removes foreign objects accumulated on the workpiece 8. Such robotic hand type washing machine includes the model JCC 503 Robo manufactured by the applicant.

The actuator 2 is a drive unit of a robot in an orthogonal axes type. The actuator 2 includes a quill 2a, which is moved in an XYZ-direction by a numerical control device (not illustrated). A distal end portion of the quill 2a includes a B-axis saddle 2b, which rotates about a rotating shaft 3 (a B-axis). The B-axis saddle 2b includes a C-axis saddle 2c, which rotates about a rotating shaft 4 (a C-axis). A distal end of the C-axis saddle 2c includes a hand changer 5 on which the hand 35 is attached. It is needless to say that the names of the axes are examples and changeable.

The hand changer 5 moves along an attaching direction 6 to connect to a connector 42, which will be described later. The hand changer 5 precisely positions to connect to the connector 42. The hand changer 5 transmits a controlling fluid such as a compressed air and an electrical signal or similar signal through the connector 42 to the hand 35. For the hand changer 5 and the connector 42, for example, a known product such as the robotic hand changer model SWR manufactured by KOSMEK LTD. can be employed.

The hand changer 5 pushes off the connector 42 when separating the connector 42. A distance that the hand changer 5 pushes out the connector 42 is referred to as a put-out distance (pushing out distance). When the hand changer 5 connects to the connector 42, the actuator 2 positions the hand changer 5 and the connector 42 at positions separated by an identical distance to the put-out distance or at positions separated by slightly larger than the put-out distance. The hand changer 5 draws the connector 42 when connecting to the connector 42 to position at a fixed position. For the actuator 2, actuators of various kinds of robots such as a vertical articulated robot, a horizontal articulated robot, and a parallel link type robot can be employed instead of the above-described orthogonal axes type robot.

The hand stocker 10 is configured to mainly include a housing board 17, a frame rack 15, and a safety fence 11. The housing board 17 is in a rectangular shape and includes a hanging mechanism 70 for hanging the hand 35 on a board surface 17a. The frame rack 15 is in a rectangular shape and slidably supports the housing board 17. The safety fence 11 surrounds the frame rack 15 and a movable region 1 of the actuator 2.

The safety fence 11 separates a human body and the actuator 2. Preferably, the safety fence 11 includes a wire netting or a transparent plastic viewing window for visually perceiving the inside. Inside the safety fence 11, a roller conveyor 7 is disposed. The roller conveyor 7 conveys the workpiece 8 within the movable region 1. The actuator 2 operates the workpiece 8 conveyed by the roller conveyor 7 with the hand 35 connected by the hand changer 5.

Although an illustration is omitted, the plurality of housing boards 17 are disposed within the movable region 1 to house the various kind of hands 35 that are applicable to varieties of the workpiece 8. A part of the plurality of housing boards 17 is, for example, slidably supported with the frame rack 15 and the other housing boards 17 are fixed to the frame rack 15. Surely, all the housing boards 17 may be slidable. The housing board 17 houses the plurality of kinds of hands 35 applicable to the varieties of the workpiece 8 by hanging one by one. The actuator 2 selects and attaches the hand 35 that is applicable to the variety of the workpiece 8 that is held from the plurality of housing boards 17. When the actuator 2 changes the hand 35, the actuator 2 hangs the hand 35 again onto the housing board 17 that is an empty space, and releases the connecting state of the actuator 2 and the hand 35.

Figure 2:
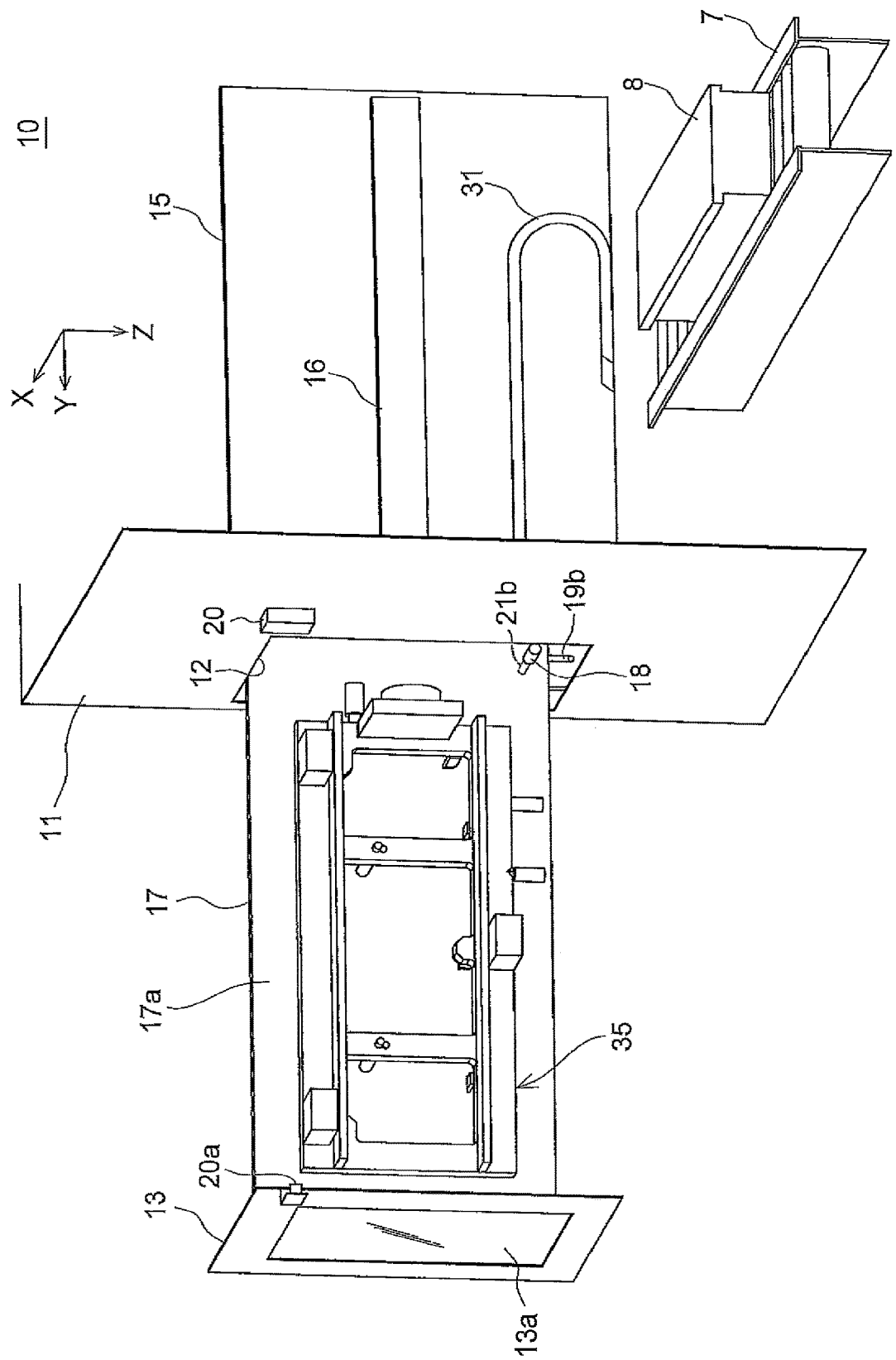
FIG. 2 is a perspective view illustrating a state where a housing board illustrated in FIG. 1 is extracted from a safety fence.

With reference to FIG. 2, a sliding member 16 extending in a longitudinal direction (a positive direction on a Y-axis) is disposed on the frame rack 15. The housing board 17 is disposed in a moving portion or a slider of the sliding member 16. This allows the housing board 17 to freely slide on the frame rack 15 guided by the sliding member 16. The safety fence 11 includes an extraction opening (an access port) 12. The housing board 17 can be extracted from the extraction opening 12 to an outside of the safety fence 11 in a state where the hand 35 is hung on the housing board 17. For the sliding member 16, for example, a telescopic slide rail, a linear guide, and a ball spline can be employed.

With reference to FIG. 1 and FIG. 2 together, a safety door 13 supported with supporting pillars 14 are disposed at an end portion in an extraction direction of the housing board 17. The safety door 13 includes a window 13a. When the housing board 17 is housed inside the safety fence 11, the safety door 13 covers the extraction opening 12. A safety switch 20 is disposed so as to neighbor the extraction opening 12 of the safety fence 11. A plug 20a of the safety switch 20 is included in the safety door 13. When the housing board 17 is completely housed, the safety door 13 covers the extraction opening 12 to prevent the human body from entering the movable region 1.

Then, the plug 20a is inserted in the safety switch 20 and the safety switch 20 detects a closed state of the safety door 13. When the housing board 17 is extracted, the safety switch 20 detects an opened state of the safety door 13. While the safety switch 20 detects the opened state of the safety door 13, the power of the actuator 2 can stop. For the safety switch 20, a safety switch of a key lock type can be employed. In this case, the housing board 17 can be extracted only when, for example, the numerical control device releases a lock, and, a power supply to the actuator 2 is stopped while unlocked.

A cable protection pipe 31 is laid between the frame rack 15 and the housing board 17 along the extraction direction (the positive direction on the Y-axis) of the housing board 17. A fixed end of the cable protection pipe 31 is fixed to the frame rack 15 and a moving end of the cable protection pipe 31 is fixed to the housing board 17. The cable protection pipe 31 houses tubes that are an electric cable and a compressed air piping.

Figure 3:
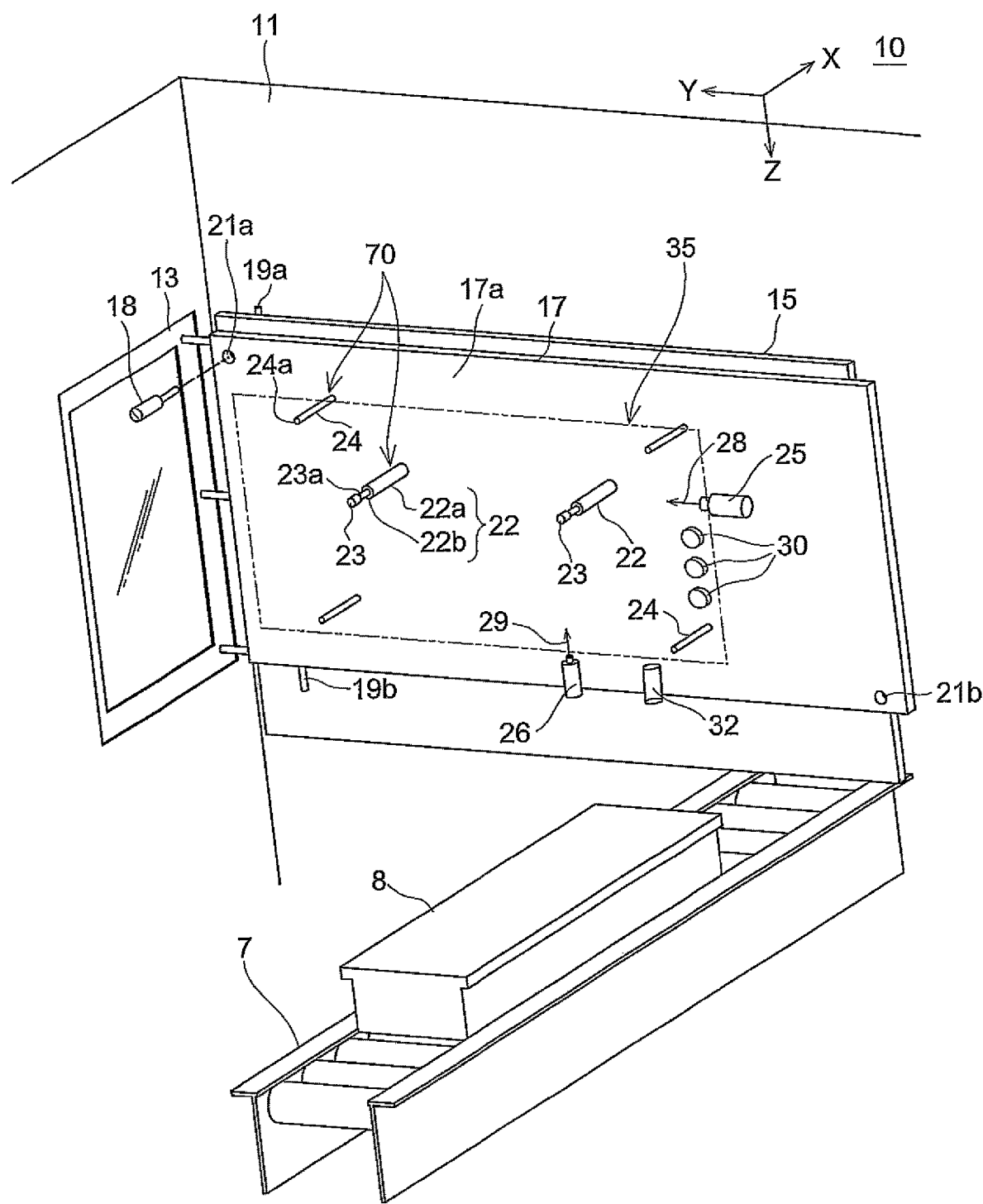
FIG. 3 is a perspective view illustrating a hanging mechanism disposed on the housing board illustrated in FIG. 1.

With reference to FIG. 3, a pair of corner portions that diagonally position on the housing board 17 include two insertion holes 21 (21a, 21b). The frame rack 15 also includes an insertion port (not illustrated). When the housing board 17 is in a state of being housed inside the safety fence 11 and attached on the frame rack 15 (the state illustrated in FIG. 3), a pin 18 is inserted in the insertion hole 21a to position the housing board 17 and the frame rack 15. The frame rack 15 includes a sensor 19a to detect the attachment of the pin 18. The pin 18 is taken out when the housing board 17 is extracted. For sensors 19 (19a, 19b), for example, a proximity sensor, a limit switch, a solenoid switch, and a contact sensor can be employed.

On the other hand, when the housing board 17 is in a state of being extracted from the extraction opening 12 as illustrated in FIG. 2, the pin 18 is inserted in the insertion hole 21b and the sensor 19b detects the insertion of the pin 18. Here, the insertion and detachment of the pin 18 may be performed by an operator or may be automatically performed by a cylinder or similar component. Inserting the pin 18 into the insertion hole 21b in a state where the housing board 17 is extracted (the state illustrated in FIG. 2) can be omitted. Inserting the pin 18 into the insertion hole 21a in a state where the housing board 17 is housed (the state illustrated in FIG. 3) can be alternatively performed by another positioning mechanism.

Next, the hanging mechanism 70 will be described. The housing board 17 includes the board surface 17a facing the hand 35 on one surface side (a forward direction in FIG. 3). The board surface 17a includes the hanging mechanism 70 for hanging the hand 35. The hanging mechanism 70 extends in a horizontal direction from the board surface 17a and includes hooking members 22, pressing members 23, and supporting members 24. The hooking members 22 engage with hanging portions 40 (described later) disposed in the hand 35. The pressing member 23 prevents the hand 35 from moving to a direction separating from the board surface 17a. The supporting member 24 restricts the hand 35 from moving to a direction approaching the board surface 17a. The housing board 17 includes a biasing mechanism 25, a positioning mechanism 26, and a plurality of sensors 30.

The two hooking members 22 are disposed being arranged in the horizontal direction in an approximate center of the housing board 17. This is to stably hang the housing board 17, but the number of the hooking member 22 may be one or plural and can be appropriately determined. The mounting position of the hooking member 22 can also be arbitrarily determined. The hooking member 22 is formed in a stepped round bar shape. The hooking member 22 includes a hooking base 22b and a pillar 22a. The hooking base 22b has a small diameter, and coaxially disposed with the pillar 22b. The hooking base 22b engaging with the hanging portion 40 (see FIG. 4) of the hand 35 hangs the hand 35 on the hooking member 22. The pillar 22a supports the hooking base 22b. The pillar 22a may be in a hexagonal prism shape or a prismatic shape, or may be a round bar of an identical diameter to the hooking base 22b. The pillar 22a may double as the supporting member 24.

A distal end portion of the hooking member 22 integrally includes the pressing member 23. The pressing member 23 is a round bar in a cylindrical shape coaxially disposed with the hooking member 22. A surface on a side of the housing board 17 of the pressing member 23 is a pressing surface 23a. The pressing surface 23a presses a contact surface 44 of the hand 35. Thus, the pressing member 23 holds the hand 35 hung on the hooking member 22 so as not to fall over. The pressing member 23 may be disposed such that the pressing surface 23a is brought in contact with the contact surface 44 of the hand 35. The hand 35 may be hung on the hooking member 22 such that a slight clearance is made between the contact surface 44 of the hand 35 and the pressing surface 23a.

The pressing member 23 may be fixed to the housing board 17 by another supporting member instead of being integrally disposed in the distal end portion of the hooking member 22. For example, the pressing member 23 may engage with the hand 35 as an L-shaped member viewed from the Y-axis direction (details will be described later). The pressing member 23 may internally include an elastic member to bias the pressing surface 23a to the contact surface 44 of the hand 35 using the elastic member.

The supporting member 24 forms a round bar shape and includes a supporting surface 24a in a distal end portion on its one surface side. The supporting surface 24a supports a support target surface 41 of the hand 35, which will be described later. The plurality of supporting surfaces 24a are disposed in a peripheral area of the hooking member 22, however, its number may be one. Preferably, the supporting surfaces 24a are disposed at three, four or more positions. This is to stably support the hand 35. Thus, the supporting surface 24a supports the hand 35 from a back surface side such that the hung hand 35 is sandwiched in coordination with the pressing surface 23a.

The supporting member 24 may be in a hexagonal prism shape, a prismatic shape, or a flat plate shape instead of the round bar shape. The supporting member 24 may be disposed bridging a plate material like a beam on end surfaces of the plurality of supporting pillars disposed on the housing board 17 (details will be described later) or may form a table shape. A table-shaped supporting member that includes a punch hole on a table surface to avoid an interference with a convex portion of the hand 35, which will be described later, may be disposed. In these cases, a surface in a −X(minus X) direction of the plate material bridging in a beam shape or the table surface becomes the supporting surface 24a. Any configuration is fine as long as the supporting member 24 includes the supporting surface 24a and the supporting surface 24a supports the hand 35. In the case where the supporting surface 24a is wide, it is needless to say that the number of the supporting surface 24a may be reduced. A height of the supporting member 24 may be adjustably disposed on the housing board 17.

A lower portion of the housing board 17 in a gravitational direction includes a hand detecting sensor 32. For the hand detecting sensor 32, what is called a seating sensor, a contact sensor, and another sensor with a narrow detecting width can be employed. Here, the injection port of the compressed air is brought into contact with the detecting target surface, and the seating sensor detects a difference of compressed air pressures between when an injection port of the compressed air is covered with a detecting target surface and when the injection port of the compressed air is not covered with the detecting target surface. That is, when the pressure of the compressed air is high, the installation of the detecting target surface is detected. Here, a flow rate of the compressed air may be detected instead of detecting the pressure of the compressed air.

The hand detecting sensor 32 detects a lower surface in the gravitational direction when the hand 35 is hung on the housing board 17. Since the detecting width of the hand detecting sensor 32 is narrow, the hand detecting sensor 32 detects that the hand 35 is precisely housed on the housing board 17. Here, the hand 35 is hung on the housing board 17 with a slight dimensional gap, but gravity precisely determines a height in the gravitational direction. Therefore, even though the detecting width of the hand detecting sensor 32 is narrow, housing (hanging) of the hand 35 at the fixed position is properly detected.

The supporting member 24 may be used as a nozzle of the seating sensor instead of disposing the hand detecting sensor 32. In this case, a structure where the pressing member 23 presses the hand 35 with respect to the supporting member 24 can be used in combination.

The biasing mechanism 25 biases the hung hand 35 to a direction 28 (the positive direction on the Y-axis). For the biasing mechanism 25, a plunger that biases a biasing member with an elastic body can be employed. The positioning mechanism 26 as an engaging member positions the Y-axis direction of the hung hand 35. The positioning mechanism 26 engages with a receiving member 27 that is a groove of the hand 35, which will be described later, to find a position of the hand 35. For the positioning mechanism 26, a protrusion that engages with a plunger, a pin, and a ball catch can be employed.

The plurality of sensors 30 are disposed on the housing board 17 to detect a type of the hand 35. For the sensor 30, a proximity sensor, a limit switch, a contact sensor, and an electromagnetic sensor can be employed. The type of the hand 35 is detected by detecting states of the plurality of the sensors 30. For example, detections by the three sensors 35 are set to 1 and non-detections by the three sensors 35 are set to 0. Then, binary numbers of 000 to 111 are assigned to every format of the hand 35. Dogs 45 (see FIG. 4) are configured to be detected by the sensors 30. The dogs 45 are mounted on the hand 35 corresponding to the respective detection numbers.

Figure 4:
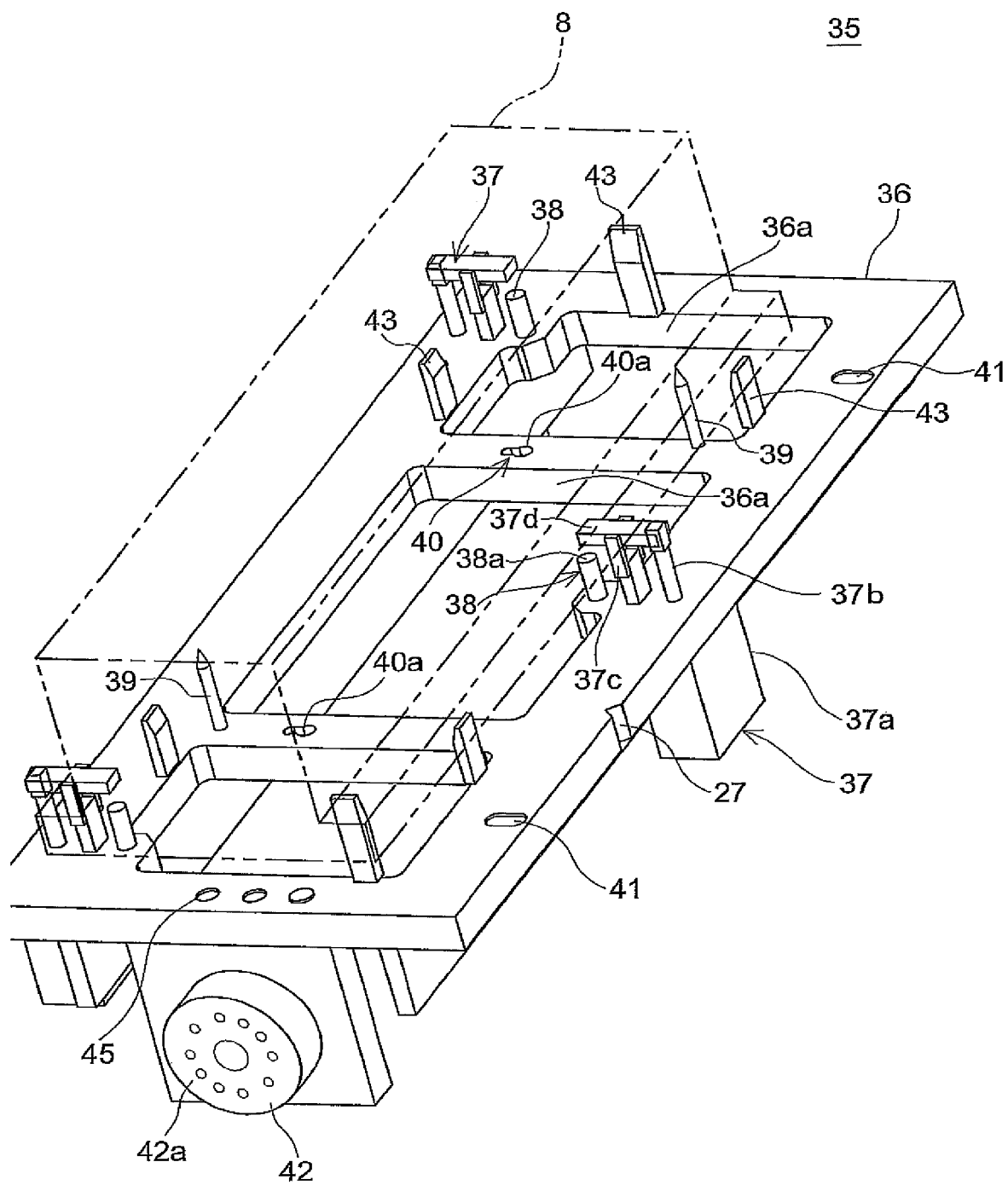
FIG. 4 is a perspective view of a hand illustrated in FIG. 1.

With reference to FIG. 4, the following describes a detailed structure of the hand 35. The hand 35 includes functional members to hold the workpiece 8 such as clamp devices 37, seating pins 38, and positioning pins 39 on one surface of a frame 36. The other surface of the frame 36 includes the connector 42, which connects to the actuator 2.

Surely, instead of the above-described configuration, the other surface of the frame 36 may further include the functional members for holding the workpiece 8. The connector 42 may be disposed on an end surface of the frame 36 (for example, left side in FIG. 4).

The frame 36 forms an approximate rectangular flat plate-shape. In the center of the frame 36, cutout holes 36a are disposed. Disposing the cutout holes 36a ensures a lightweight of the hand 35 and the reduced moment of inertia of the hand. In the case where the hand 35 is used as a hand of the above-described robotic hand type washing machine, a jet of the cleaning fluid can directly hit the workpiece 8 through the cutout holes 36a.

The seating pin 38 forms an approximate cylinder shape and is disposed to protrude in one surface of the frame 36. A distal end surface of the seating pin 38 is a smooth seating surface 38a. The seating surface 38a contacts the workpiece 8. The seating surface 38a may be one, but disposing the plurality of seating surfaces 38a is preferred. More preferably, a peripheral portion of the workpiece 8 is supported at three, four or more positions. The seating surface 38a includes a hard film such as cBN and a hard chrome plating film to enhance a wear resistance. The seating pin 38 may be fabricated with a hard material such as fine ceramics and a hard metal. Preferably, the seating surface 38a is disposed at a position facing a clamp arm 37d. Preferably, one or more seating surfaces 38a act as the seating sensor.

The clamp device 37 is constituted of a cylinder 37a, such as a compressed air cylinder, a link mechanism 37c driven by a piston shaft 37b of the cylinder 37a, and the clamp arm 37d that is opened and closed by the link mechanism 37c. The hand 35 sandwiches the workpiece 8 between the clamp arm 37d and the seating surface 38a. The positioning pin 39 forms an approximate cylinder shape having a conical surface in a distal end. The positioning pin 39 is inserted in a pin hole (not illustrated) of the workpiece 8 to determine a position of the workpiece 8 in a direction parallel with the seating surface 38a of the workpiece 8.

The connector 42 connects to the hand changer 5. The connector 42 includes fluid passages 42a, which transmit a fluid supplied from the hand changer 5 to the cylinder 37a and the seating surface 38a. The support target surface 41 abuts on the supporting surface 24a of the supporting member 24. Preferably, the support target surface 41 is disposed at an accurate position with respect to the connector 42 by, for example, machining. The support target surface 41 is preferred to include a wear resistance film. A height of the support target surface 41 may be adjustably disposed with respect to the contact surface 44 described later. Surely, if a whole surface of the hand 35 is fabricated with high accuracy by, for example, machining, disposing the support target surface 41 is not particularly necessary.

The frame 36 is preferred to include the dogs 45 for determining the type of the hand 35, a guiding member 43 for guiding an insertion of the workpiece 8, and the receiving member 27 for positioning the hand 35 by engaging with the positioning mechanism 26 disposed on the housing board 17. For the receiving member 27, for example, a cone-shaped hole and a ball catch can be employed other than the V-shaped groove in the cross section illustrated.

The positioning mechanism 26 and the receiving member 27 may be removed. The positioning mechanism 26 may be disposed in the hand 35 and the receiving member 27 may be disposed on the housing board 17 instead of disposing the positioning mechanism 26 on the housing board 17 and the receiving member 27 in the hand 35.

Figure 5:
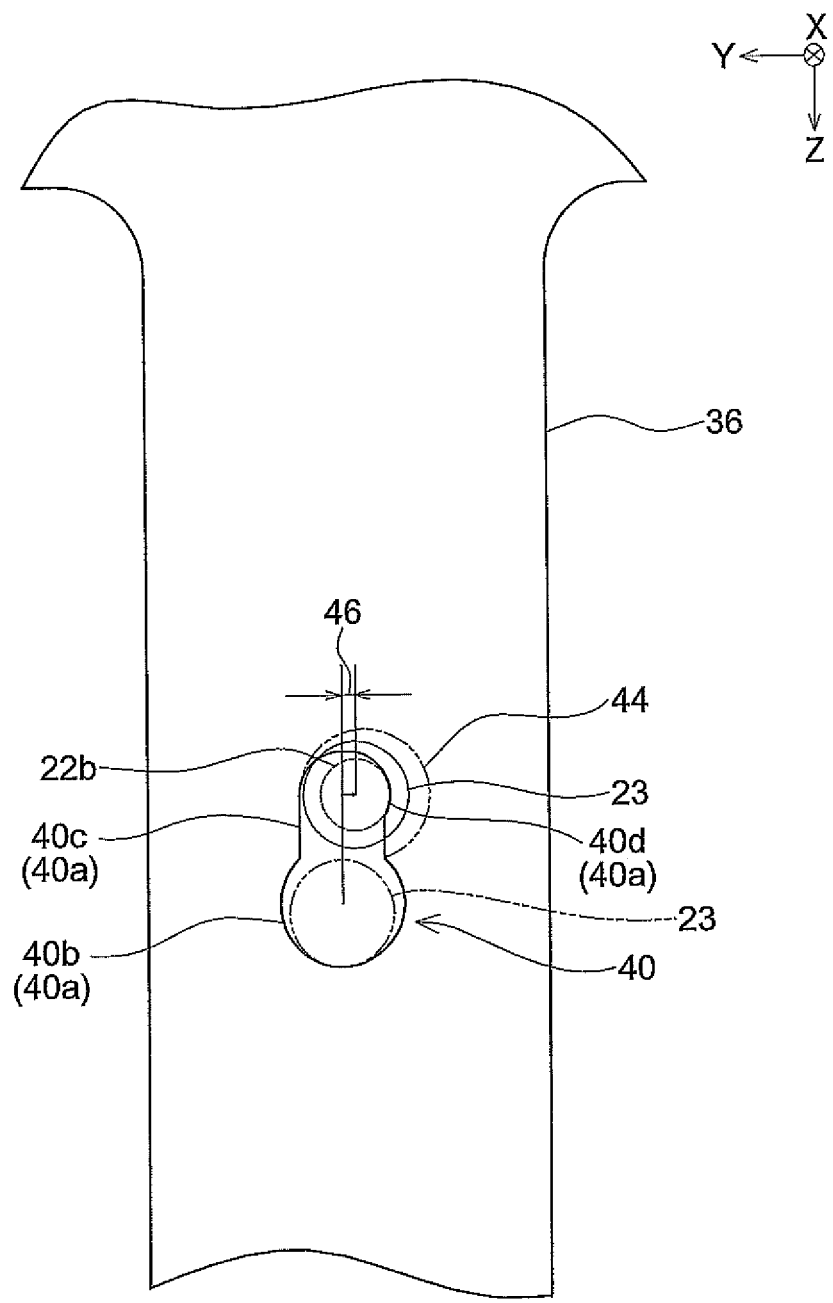
FIG. 5 is a partially enlarged view of a hanging portion of a hand illustrated in FIG. 4.

With reference to FIG. 5, the following describes the hanging portion 40 in detail. The hanging portion 40 includes an opening 40a in the frame 36. As illustrated in FIG. 5, this opening 40a is formed in an approximate gourd shape including a large diameter portion 40b, a small diameter portion 40c in an elongated hole shape continuously extending to an upper side from this large diameter portion 40b, and a key portion 40d disposed in a distal end of the small diameter portion 40c such that the small diameter portion 40c is locked. The small diameter portion 40c is disposed to face an upper side in the gravitational direction (see FIG. 1) when the hand 35 is housed on the housing board 17. The hanging portion 40 is disposed to penetrate the frame 36. That is, the opening 40a in this embodiment is a gourd-shaped through-hole.

A distance 46 of the key portion 40d is set to a distance as large as or slightly larger than the separation distance (the put-out distance) between the hand changer 5 and the connector 42 when the hand changer 5 and the connector 42 are attached. The key portion 40d is disposed in a direction facing the connector 42. This is because the hand changer 5 pushes out the connector 42 when the hand changer 5 separates the connector 42.

Depending on a function used when the hand changer 5 separates the connector 42, the key portion 40d may be omitted or may be disposed in the opposite direction of the connector 42. However, in the case where the actuator 2 needs to draw the hand changer 5 when the hand changer 5 separates the connector 42, the key portion 40d is disposed in the opposite direction of the connector 42.

A peripheral area of the key portion 40d on a front surface of the frame 36 is the contact surface 44 that contacts the pressing surface 23a of the pressing member 23. Preferably, the contact surface 44 is disposed to have a slight clearance with the pressing surface 23a in a state where the hand 35 is hung on the housing board 17 (in the housed state). This clearance is designed to be larger than an extent that can absorb a fluctuation of a servo system of the actuator 2 or a thermal expansion of the hand 35 when the actuator 2 attaches or detaches the hand 35. Inclination of the hand 35 caused by this clearance is designed to be smaller than an acceptable limit of the inclination when the actuator 2 and the hand 35 are attached.

A surface that contacts the hooking base 22b and the pressing member 23 in the hanging portion 40 preferably includes a hard film of such as cBN, hard chrome plating, and titanium nitride to enhance the wear resistance. The contact surface 44 is preferably disposed at an accurate position with respect to the support target surface 41 or the connector 42 by, for example, machining. For example, the contact surface 44 is disposed on the frame 36 by machining.

The hanging portion 40 may be a depressed portion instead of the above-described gourd-shaped through-hole. Specifically, the gourd-shaped opening 40a is formed on a side of a hanging surface of the frame 36 (a top surface side in FIG. 4) and a cavity configured to house the pressing member 23 is disposed inside the opening 40a. In this case, a portion that is an inner surface of the cavity and around the opening 40a is the contact surface 44 contacting the pressing surface 23a of the pressing member 23.

In the above description, including the wear resistance films on the support target surface 41 and the contact surface 44 is described as a preferable configuration. Surely, the whole surface of the hand 35 or the frame 36 may include the wear resistance film. Especially, in the case where the hand 35 is used for deburring by a high-pressure washing and a high-pressure jetting, the whole surface of the hand 35 or the frame 36 is preferred to include the wear resistance film. In this case, if the hand 35 is covered with the wear resistance film where the hand 35 is exposed to the high-pressure jet, which is the whole surface of the hand 35, erosion caused by the jetting of the hand 35 can be reduced.

Next, with reference to FIG. 1 and FIG. 5 together, the following describes a housing method of the hand 35. To house the hand 35 in the hand stocker 10, firstly, the actuator 2 is operated to align the large diameter portion 40b of the gourd-shaped through-hole with the pressing member 23. Then, the hand 35 is moved to a positive direction on an X-axis to insert the pressing member 23 into the large diameter portion 40b. In a state where the pressing member 23 has completely passed through the frame 36 and a back surface of the hand 35 is in contact with the supporting surface 24a of the supporting member 24, the actuator 2 is operated to drop the hand 35 in a positive direction on a Z-axis (a downward direction). At this time, the hooking base 22b of the hooking member 22 has passed through the small diameter portion 40c of the gourd-shaped throughhole, and the pressing member 23 and the pillar 22a of the hooking member 22 face via the small diameter portion 40c. The hand changer 5 and the connector 42 are separated at a height where the hooking base 22b reaches an upper end of the small diameter portion 40c.

When the hand changer 5 separates the connector 42, the hand changer 5 slightly pushes out the hand 35 in the positive direction on the Y-axis, which is the attaching direction 6 of the hand 35. At this time, the hand 35 moves with respect to the hooking base 22b of the hooking member 22 and the hooking base 22b fits in the key portion 40d. When the hand 35 is hung on the housing board 17, the biasing mechanism 25 biases the hand 35 toward the direction 28 (the positive direction on the Y-axis). Since the hand 35 is biased by the biasing mechanism 25, the hooking base 22b fits in the key portion 40d all the time and a position of the hand 35 in the Y-axis and X-axis direction is determined. That is, the biasing mechanism 25 has a function to keep the hand 35 at a predetermined position on the housing board 17.

The contact surface 44 is at a position facing the pressing member 23 with just a slight clearance, and the hand 35 positions between the pressing member 23 and the supporting member 24. The hand 35 is prevented from moving to the direction separating from the board surface 17a of the housing board 17 (a negative direction on the X-axis) by the pressing member 23 and restricted from moving to the direction approaching the board surface 17a of the housing board 17 (the positive direction on the X-axis) by the supporting member 24. Therefore, a position of the hand 35 in the X-axis direction is also determined. Thus, housing the hand 35 in the hand stocker 10 with a slight gap ensures absorbing the fluctuation of the servo system of the actuator 2 when the actuator 2 attaches or detaches the hand 35.

Next, the following describes a method for attaching the hand 35 to the actuator 2. The actuator 2 brings the hand changer 5 close to the connector 42 with a clearance between the hand changer 5 and the connector 42 equal to the distance 46 or slightly smaller than the distance 46 (the put-out distance). Then, the connector 42 draws the hand 35, and connects the hand 35. After connecting the hand changer 5 to the connector 42, the hand 35 can be removed from the housing board 17 in accordance with the above-described procedure for hanging the hand 35 on the housing board 17 in the reversed order.

As described above, the hand stocker 10 according to the embodiment ensures reducing an installation area of the hand stocker 10 compared with, for example, a configuration of horizontally placing the hand 35 on a housing table since the hand 35 is housed by being hung on the housing board 17. Especially, as illustrated in the embodiment, in the case where the actuator 2 in the orthogonal axis type is used and the case where the hand 35 is installed inside the movable region 1, a region available for conveying is reduced by the installation space (volume) of the hand stocker 10. In this case, hanging (leaning) the hand 35 on the housing board 17 in the hand stocker 10 gives a large region usable for conveying inside the movable region 1.

Since the housing board 17 can be extracted to the outside of the movable region 1 (the outside of the safety fence 11) from the extraction opening 12, the hand 35 housed in the hand stocker 10 can easily be changed, thus, the hand stocker 10 is excellent in work efficiency. Maintenance of the housing board 17 is also simple. In the case where the movable region 1 of the actuator 2 is sectioned by a region for the hand stocker 10 and another working region (not illustrated), even during the time where the actuator 2 is operating in the other working region, the housing board 17 can be extracted to the outside of the movable region 1.

The hand stocker 10 does not include any movable component except for the positioning mechanism 26 and the biasing mechanism 25. That is, the hand stocker 10 according to the embodiment has a simple structure with a small numbers of the movable parts compared with a conventional technique. In view of this, the hand stocker 10 hardly requires maintenance. No electric component except for the sensors 19a, 19b, and 30 are included. For the sensors 19a, 19b, and 30, a proximity sensor, a limit switch, and a contact sensor can be employed. These sensors are typically high in durability and reliability. Since the number of the electric components is considerably small, the hand stocker 10 has considerably little electrical troubles.

Second Embodiment

Figure 6:
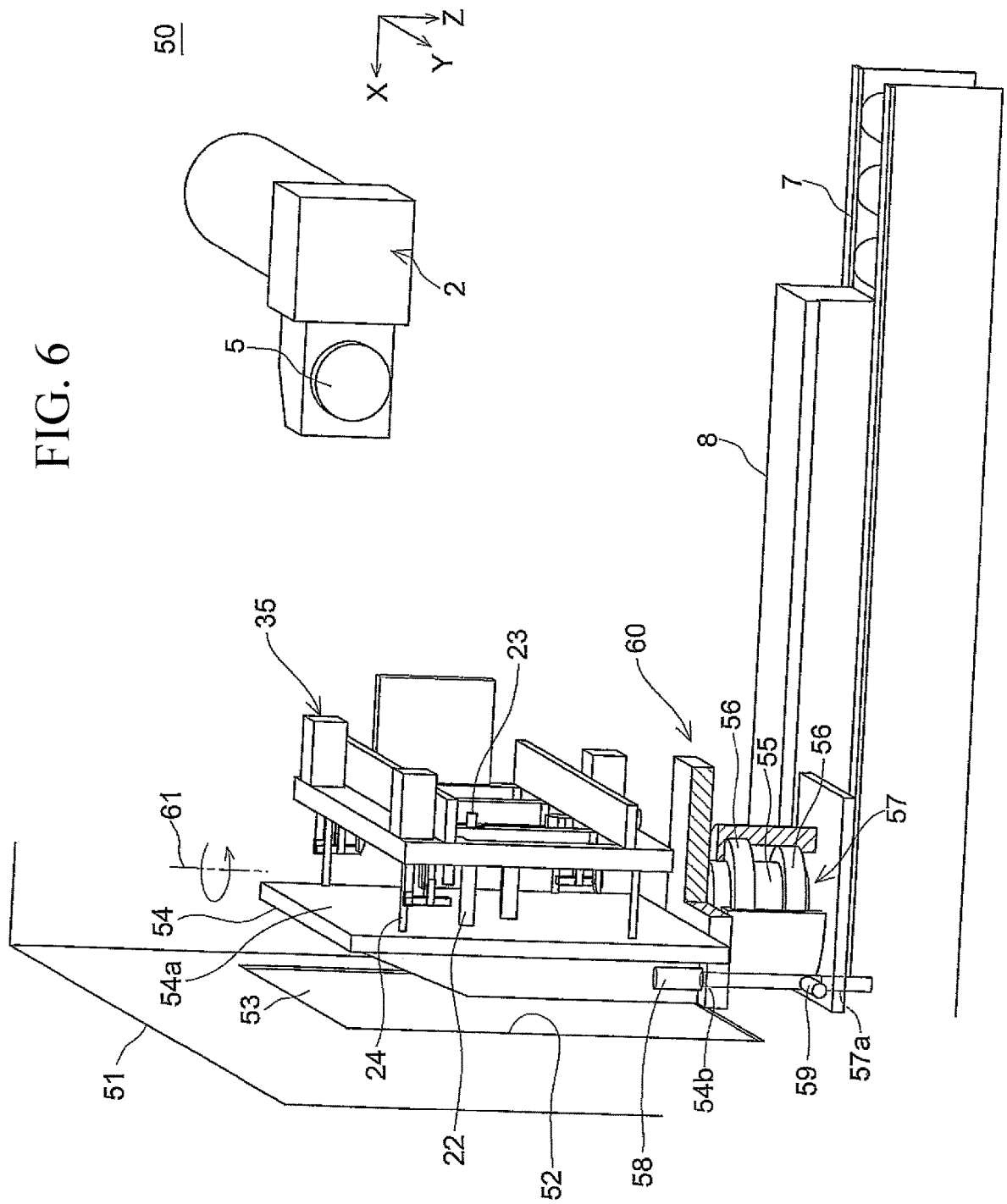
FIG. 6 is an external perspective view of a hand stocker according to a second embodiment of the present invention.

In accordance with FIG. 6, the following describes a hand stocker 50 of a second embodiment. The hand stocker 50 has a turning base 54 placed on a turning unit 60. A safety door 53 is disposed in a part of a safety fence 51 in a back of the turning base 54. Other parts are identical to the above-described first embodiment. The configuration similar to the first embodiment designates identical reference numerals to the first embodiment and therefore such elements will not be further elaborated here.

The turning base 54 corresponds to the housing board 17 in the first embodiment. A board surface 54a includes the hooking member 22, the supporting member 24, and the pressing member 23 as a hanging mechanism.

The turning unit 60 is mainly constituted of a frame rack 57 and a turning shaft 55. The turning shaft 55 is disposed in a lower portion of the turning base 54 in the gravitational direction. The turning shaft 55 is rotatably supported with bearings 56 on the frame rack 57 about an axis 61. The turning base 54 includes an insertion hole 54b for inserting a pin 58. The frame rack 57 also includes an insertion hole 57a for inserting the pin 58. Since the pin 58 is fitted and inserted in the insertion hole 54b and 57a, the hand stocker 50 is accurately positioned in a rotation direction in its housed state. The frame rack 57 includes a sensor 59 to detect an insertion of the pin 58.

The frame rack 57 may include a mechanical stopper (not illustrated) to determine a turning range of the turning base 54. Then, the turning base 54 includes a butt portion that butts against the above-mentioned mechanical stopper at a limit of the turning range (a turning end). Then, a sensor to detect that the butt portion abuts on the mechanical stopper and the turning base 54 is at the turning end may be disposed on the frame rack 57.

The safety fence 51 includes a turn opening (an access port) 52 for accessing the hand 35 hung on the turning base 54 when the turning base 54 rotates. Then, the safety door 53 is disposed to close the turn opening 52. The safety door 53 may be fastened using a bolt or may be disposed as an opening door on the safety fence 51 using a hinge (not illustrated). When the safety door 53 is disposed as the opening door, a safety switch (not illustrated) is preferably disposed.

When the hand 35 housed in the hand stocker 50 is changed, the operator removes (or opens) the safety door 53. Then, the operator pulls out the pin 58. Pulling out the pin 58 causes the sensor 59 to detect that the pin 58 is pulled out. Thereafter, the operator turns the turning base 54 by 180° for the board surface 54a of the turning base 54 to face the turn opening 52. Then, the operator changes the hand 35. After the hand 35 is changed, the hand stocker 50 is returned to the housed state by performing the former procedure in the reversed order.

With the hand stocker 50 according to the second embodiment, the turning base 54 turns about the axis 61 to ensure a reduced space in the Y-axis direction compared with the first embodiment where the housing board 17 slides. Other operational advantages are similar to the first embodiment.

Third Embodiment

Figure 7:
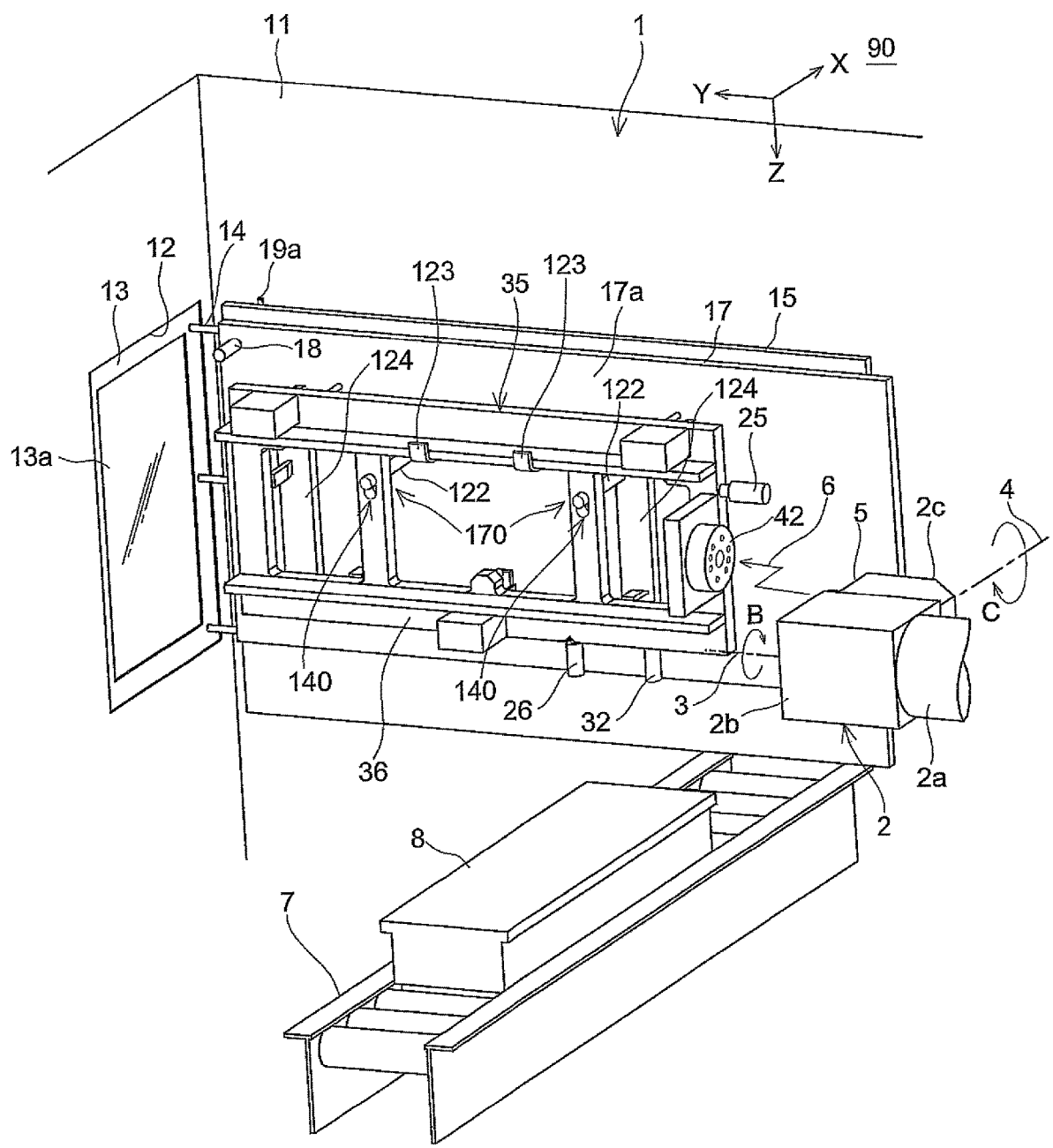
FIG. 7 is an external perspective view of a hand stocker according to a third embodiment of the present invention.
Figure 8:
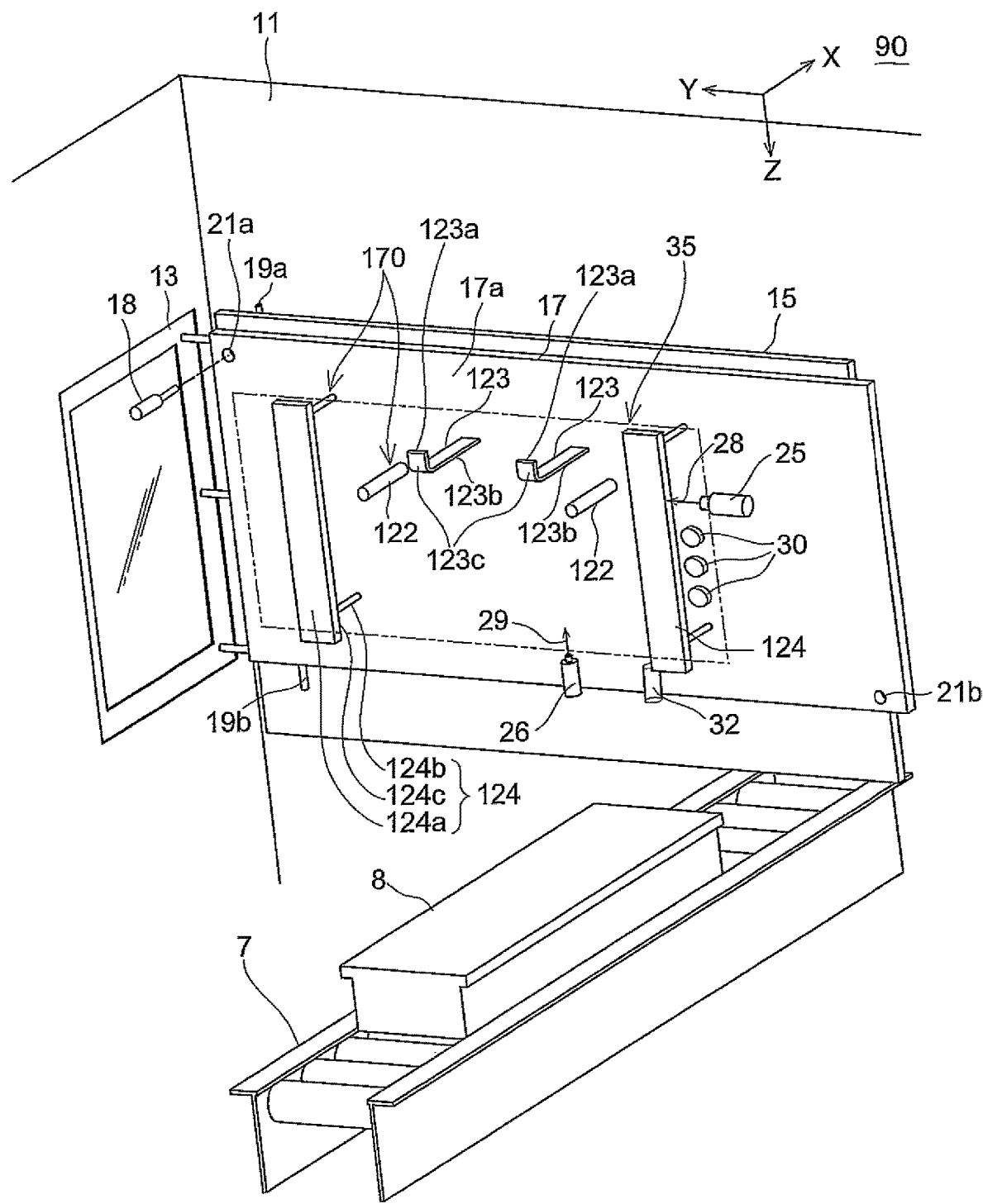
FIG. 8 is a perspective view illustrating a hanging mechanism disposed on the housing board illustrated in FIG. 7.
Figure 9:
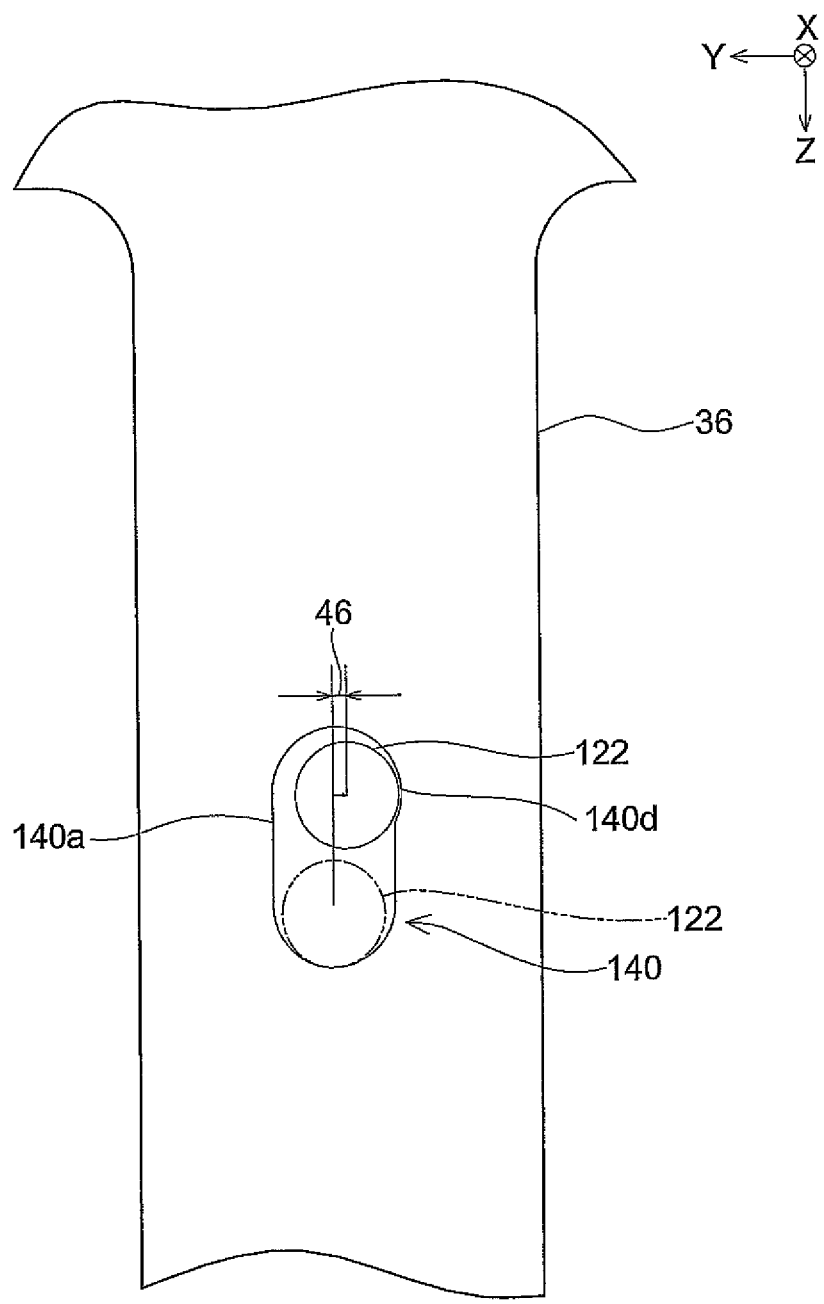
FIG. 9 is a partially enlarged view of a hanging portion of a hand illustrated in FIG. 7.

With reference to FIG. 7 to FIG. 9, the following describes a hand stocker 90 according to a third embodiment. The hand stocker 90 according to the third embodiment differs from the first embodiment mainly in a configuration of a hanging mechanism 170 and hanging portions 140. Therefore, the following describes the differences. Other configurations are designated by identical reference numerals to the first embodiment and then such elements will not be further elaborated here.

As illustrated in FIG. 8, the hanging mechanism 170 extends from the board surface 17a in the horizontal direction and includes hooking members 122, pressing members 123, and supporting members 124. The hooking member 122 engages with the hanging portion 140 (described later) disposed in the hand 35. The pressing member 123 extends in the horizontal direction from the board surface 17a and prevents the hand 35 from moving to the direction separating from the board surface 17a. The supporting member 124 is disposed on the board surface 17a and restricts the hand 35 from moving to the direction approaching the board surface 17a.

The hooking member 122 is formed in a round bar shape. The two hooking members 122 are disposed being arranged in the horizontal direction in the approximate center of the housing board 17. The two pressing member 123 are disposed being arranged in the horizontal direction above the hooking members 122. The pressing member 123 is a hook shaped member including a horizontal portion 123b and an upright portion 123c standing upward from this horizontal portion 123b. A surface of the upright portion 123c facing the board surface 17a is a pressing surface 123a abutting the hand 35. The pressing member 123 prevents the hand 35 from moving to the direction separating from the board surface 17a.

The supporting member 124 includes two support pillars 124b extending in the horizontal direction from the board surface 17a of the housing board 17 and a beam-like elongated plate 124c disposed on end surfaces of each of the support pillars 124b. A front face of the plate 124c is a supporting surface 124a, which abuts on the hand 35. That is, this embodiment is configured to support the hand 35 with the supporting surface 124a of the plate 124c, which is also different from the first embodiment.

In the third embodiment, shapes of the hanging portions 140 of the hand 35 differ from the first embodiment depending on shapes of the hooking members 122. Specifically, as illustrated in FIG. 9, an elongated hole 140a slightly larger than a diameter of the hooking member 122 is disposed. This elongated hole 140a continues to form a key portion 140d in an upper end portion. Thus configured third embodiment can also achieve a similar operational advantage to the first embodiment.

The present invention is not limited to the above-described embodiments and various configurations are possible without departing from the scope of the present invention. All the technical matter included in the technical ideas described in the scope of claims is subjected to the present invention. For example, a biasing mechanism to bias the hand 35 in the X-direction or the Z-direction can further be added on the housing board 17. These added biasing mechanisms ensure accurately positioning a housing position of the hand 35 housed in the hand stocker. For example, configurations of the hooking members 22 and 122, the pressing members 23 and 123, and the supporting members 24 and 124 may be disposed in combination as necessary on one housing board 17. While the above-described embodiments indicate preferred examples, a person skilled in the art should be able to achieve various alternative examples, corrected examples, modification examples, or improved examples from the content of this disclosure, which are included in a technical range described in the scope of claims attached.

What is claimed is:

1. A hand stocker, comprising:
   a hand configured to attach to an actuator, the hand including a frame, clamp devices attached to the frame and configured to hold a workpiece, and a connector attached to the frame and connectable to the actuator; and
   a housing board that houses the hand in a hung state, the housing board including a hanging mechanism hanging the hand on a board surface facing the hand, wherein the hanging mechanism includes:
      a hooking member that extends in a horizontal direction from the board surface to engage with a hanging portion disposed in the hand;
      a pressing member that prevents the hand hung on the hooking member from moving to a direction separating from the board surface; and
      a supporting member that restricts the hand hung on the hooking member from moving to a direction approaching the board surface,
   wherein:
   the hand is sandwiched between the pressing member and the supporting member and housed,
   the hanging portion of the hand is a depressed portion or a through-hole in a gourd shape having a large diameter portion and a small diameter portion continuing to the large diameter portion,
   the pressing member is integrally disposed in a distal end portion of the hooking member,
   the pressing member has a shape configured to pass through the large diameter portion and configured to be impossible to pass through the small diameter portion,
   the hand is sandwiched between the pressing member and the supporting member and housed by inserting the hooking member in the depressed portion or the through-hole in the gourd shape such that the pressing member faces the hooking member across the small diameter portion,
   the small diameter portion is in an elongated hole shape and extends to an upper side from the large diameter portion,
   a key portion is disposed in a distal end of the small diameter portion such that the small diameter portion is locked in an in-plane direction of the hand, and
   the hooking member abuts the key portion when the hand is separated from the actuator.

2. The hand stocker according to claim 1, wherein:
   the hanging mechanism includes a plurality of the hooking members and a plurality of the supporting members, and the plurality of supporting members are disposed on the board surface so as to surround the plurality of hooking members.

3. The hand stocker according to claim 1, further comprising
a biasing mechanism that biases the hand hung on the board surface toward a direction along which the hand is configured to attach to the actuator.

4. The hand stocker according to claim 1, further comprising
a positioning mechanism that positions the hand to be hung on a predetermined position on the board surface.

5. The hand stocker according to claim 1, further comprising:
a frame rack that movably supports the housing board; and
a safety fence that surrounds the housing board and the frame rack, wherein:
the safety fence includes an access port, the hand extracted from the housing board through the access port, and
the hand hung on the housing board is changeable via the access port from an outside of the safety fence.

6. The hand stocker according to claim 1, wherein
the frame is provided in a flat plate shape and has a lightening portion at a central portion.

7. The hand stocker according to claim 1, wherein
the housing board includes a hand detecting sensor for detecting the hand.

8. The hand stocker according to claim 1, wherein
the housing board is provided with a sensor for detecting a type of the hand.

9. A hand stocker, comprising:
a hand configured to attach to an actuator, the hand including a frame, clamp devices attached to the frame and configured to hold a workpiece, and a connector attached to the frame and connectable to the actuator;
a housing board that houses the hand in a hung state, the housing board including a hanging mechanism hanging the hand on a board surface facing the hand; and
a biasing mechanism that biases the hand hung on the board surface toward a direction along which the hand is configured to attach to the actuator, wherein
the hanging mechanism includes:
a hooking member that extends in a horizontal direction from the board surface to engage with a hanging portion disposed in the hand;
a pressing member that prevents the hand hung on the hooking member from moving to a direction separating from the board surface; and
a supporting member that restricts the hand hung on the hooking member from moving to a direction approaching the board surface,
wherein:
the hanging portion of the hand is a gourd-shaped recess or through-hole that has a large diameter portion and a small diameter portion continuously extending upward to the large diameter portion;
a key portion is disposed in a distal end of the small diameter portion such that the small diameter portion is locked in an in-plane direction of the hand;
the pressing member is integrally disposed in a distal end portion of the hooking member;
the pressing member has a shape configured to pass through the large diameter portion and configured to be impossible to pass through the small diameter portion;
the hand is sandwiched between the pressing member and the supporting member and is housed by inserting the hooking member in the depressed portion or the through-hole in the gourd shape such that the pressing member faces the hooking member across the small diameter portion; and
the hand is held at a predetermined position by the biasing mechanism so that the hand moves with respect to the hooking member and the hooking member fits in the key portion.

* * * * *